J. W. Clark,
Picket Cutter.
No. 113,629. Patented Apr. 11, 1871.
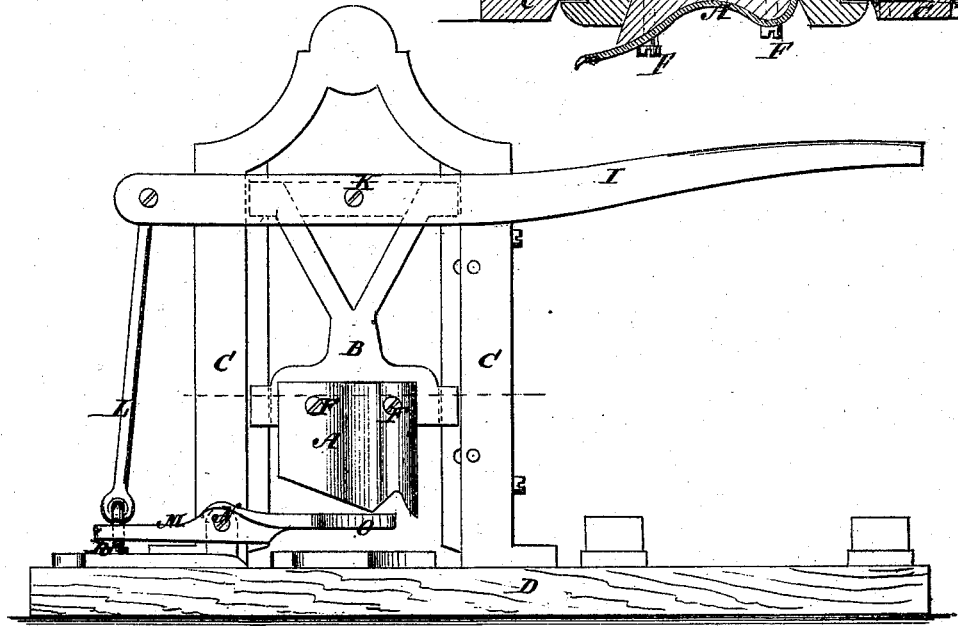
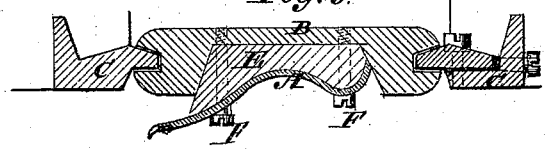
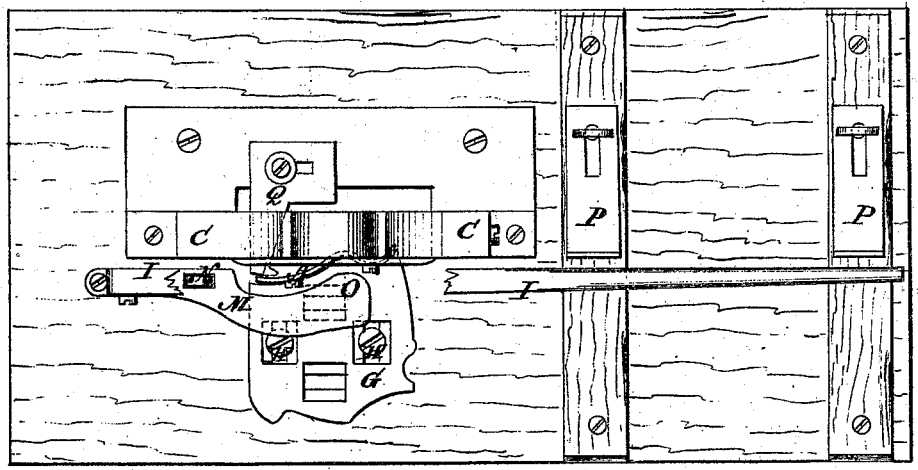
Witnesses:
E. Wolff
Wm. H. C. Smith.
Inventor:
J. W. Clark.
per Munn & Co
Attorneys.

United States Patent Office.

JAMES W. CLARK, OF OUTVILLE, OHIO.

Letters Patent No. 113,629, dated April 11, 1871.

IMPROVEMENT IN PICKET-CUTTERS.

The Schedule referred to in these Letters Patent and making part of the same.

*To all whom it may concern:*

Be it known that I, JAMES W. CLARK, of Outville, in the county of Licking and State of Ohio, have invented a new and improved Picket-Cutter; and I do hereby declare that the following is a full, clear, and exact description thereof, which will enable others skilled in the art to make and use the same, reference being had to the accompanying drawing forming part of this specification.

This invention relates to a new and improved machine for cutting the pickets near the ends, for making the ornamental tops; and It consists in a broad thin cutter of steel, shaped in cross-section, to correspond with the line to which it is required to shape the picket on each side, and a corresponding bed-plate or cutter, the first-mentioned cutter being mounted on a vertically-reciprocating cross-head, arranged in suitable guides, and provided with a hand-lever for operating it, said hand-lever being connected by a rod with a clamping-lever on the bed-plate, under which, at one end, the picket is placed, and clamped for holding it in place while the cutting is done, the said clamping being effected by the power applied to the lever for effecting the cutting.

Figure 1 is a side elevation of my improved machine;

Figure 2 is a plan view; and

Figure 3 is a section on the line *y y* of fig. 1.

Similar letters of reference indicate corresponding parts.

A is the vertically-moving cutter, mounted on the reciprocating cross-head B, which works on guides on the posts C, rising upward from the bed-plate D, one of which guides is adjustable to take up the slack caused by wear.

This cutter is shaped in cross-section, to correspond with the line on which it is desired to cut the ornamental figure on each side of the picket, as clearly indicated in fig. 3, and it is attached to a block, E, having the same form on the side to which the cutter is attached as the form of said cutter.

This block is fitted in a cavity in the cross-head, and secured by the same bolts F that secure the cutter to it.

The edge of this cutter is made oblique to the horizontal line, as indicated in fig. 2, for the purpose of operating in the manner of shears.

The bed-cutter is a plate, G, of steel, having one edge shaped to correspond with the cutter A, and it is clamped down upon the bed so that the cutter A will work snugly against said edge. It is clamped down upon the bed by screws H passing through elongated holes is a way to admit of adjusting it.

I is the working-lever; it is pivoted to the cross-head at K, and the end of the short arm is connected by a vertical rod, L, with a clamping-lever, M, pivoted to the bed at N, and working at the other end, O, in front of the cutter, so as to be clamped down on the picket which is placed under it by the action of the lever K in forcing the cutter A down, and to release the picket when the cutter A is raised.

The picket is laid on the bed along the adjustable guides P, with the end which is to be cut against the adjustable gauge Q.

When one side has been cut the picket is turned over and the other cut in the same way. This reduces the end which is placed against the gauge Q to a point, when the knife of the form here shown is used.

An adjustable screw, R, is arranged in the bed under the end of lever M, to which the lever I is connected, to regulate the lifting of said lever M.

Having thus described my invention,

I claim as new and desire to secure by Letters Patent—

The combination, with the vertically-reciprocating knife A and the lever I, by which it is operated, of the clamping-lever M and rod L, substantially as specified.

JAMES W. CLARK.

Witnesses:
 DANIEL HEWIT,
 A. T. HOWLAND.